(12) United States Patent
Bower, III et al.

(10) Patent No.: US 11,804,970 B2
(45) Date of Patent: Oct. 31, 2023

(54) BASEBOARD MANAGEMENT CONTROLLER GROUP ADMINISTRATION

(71) Applicant: LENOVO GLOBAL TECHNOLOGY (UNITED STATES) INC., Morrisville, NC (US)

(72) Inventors: Fred Allison Bower, III, Durham, NC (US); Ming Lei, Shanghai (CN); Michael Gerard Demeter, Roswell, GA (US); Scott A. Piper, Kirkland, WA (US)

(73) Assignee: LENOVO GLOBAL TECHNOLOGY (UNITED STATES) INC., Morrisville, NC (US)

( * ) Notice: Subject to any disclaimer, the term of this patent is extended or adjusted under 35 U.S.C. 154(b) by 99 days.

(21) Appl. No.: 17/502,835

(22) Filed: Oct. 15, 2021

(65) Prior Publication Data
US 2023/0118344 A1   Apr. 20, 2023

(51) Int. Cl.
*G06F 9/4401* (2018.01)
*H04L 9/32* (2006.01)

(52) U.S. Cl.
CPC .......... *H04L 9/3265* (2013.01); *G06F 9/4401* (2013.01); *H04L 9/3268* (2013.01)

(58) Field of Classification Search
CPC ..... H04L 9/3265; H04L 9/3268; H04L 9/321; H04L 9/3247; H04L 9/3263; G06F 9/4401
See application file for complete search history.

(56) References Cited

U.S. PATENT DOCUMENTS

| | | | |
|---|---|---|---|
| 6,986,046 B1 * | 1/2006 | Tuvell | H04L 12/1822 713/168 |
| 2009/0150968 A1 * | 6/2009 | Ozzie | H04L 63/08 707/999.102 |
| 2014/0082163 A1 * | 3/2014 | Senga | H04W 84/20 709/220 |
| 2015/0277856 A1 * | 10/2015 | Payne | G06F 7/588 708/250 |
| 2022/0191047 A1 * | 6/2022 | Irazabal | H04L 9/0833 |
| 2022/0278855 A1 * | 9/2022 | Jacquin | H04L 9/3271 |
| 2022/0407900 A1 * | 12/2022 | Gawande | G10L 15/22 |

* cited by examiner

*Primary Examiner* — Carl G Colin
*Assistant Examiner* — Hany S. Gadalla (57) ABSTRACT

Baseboard management controller ('BMC') group administration includes: receiving, by a member BMC from a leader BMC, a leader certificate and a request to join a group of the leader BMC, where the request is signed by the leader BMC and the leader certificate is signed by a certificate authority; authenticating, by the member BMC, the leader certificate and the request; and sending, by the member BMC, an acknowledgement to the leader BMC to join the leader BMC's group.

20 Claims, 5 Drawing Sheets

BASEBOARD MANAGEMENT CONTROLLER GROUP ADMINISTRATION

BACKGROUND

Field of the Disclosure

The field of the disclosure is data processing, or, more specifically, methods and computer program product for baseboard management controller group administration.

Description of Related Art

Multiple baseboard management controllers ('BMCs') may be grouped together in order to allow a single BMC to manage and control multiple other BMCs and their associated computing systems. In order for the leader BMC of a group to manage the other member BMCs of a group, the leader BMC must first authenticate to each of the member BMCs. During such authentication, systems require that that a group name and a group password be manually configured in all of the group member BMCs. Such authentication techniques require considerable time and resources.

SUMMARY

Methods, apparatus, and products for baseboard management controller ('BMC') group administration according to various embodiments are disclosed in this specification. In accordance with one aspect of the present disclosure, such BMC group administration may include: receiving, by a member BMC from a leader BMC, a leader certificate and a request to join a group of the leader BMC, where the request is signed by the leader BMC and the leader certificate is signed by a certificate authority; authenticating, by the member BMC, the leader certificate and the request; and sending, by the member BMC, an acknowledgement to the leader BMC to join the leader BMC's group.

In accordance with another aspect of the present disclosure, a method of BMC group administration includes: sending, by a leader BMC to a member BMC, a request to join a group of the leader BMC and a leader certificate signed by a certificate authority; and receiving, by the leader BMC responsive to the member BMC authenticating the request and the leader certificate, an acknowledgement from the member BMC to join the leader BMC's group.

In accordance with another aspect of the present disclosure, a computer program product for BMC group administration includes a non-volatile computer readable storage medium and computer program instructions stored therein that are configured to, when executed by a processor, cause a computer to perform operations including, receiving, by a member BMC from a leader BMC, a leader certificate and a request to join a group of the leader BMC, where the request is signed by the leader BMC and the leader certificate is signed by a certificate authority; authenticating, by the member BMC, the leader certificate and the request; and sending, by the member BMC, an acknowledgement to the leader BMC to join the leader BMC's group.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
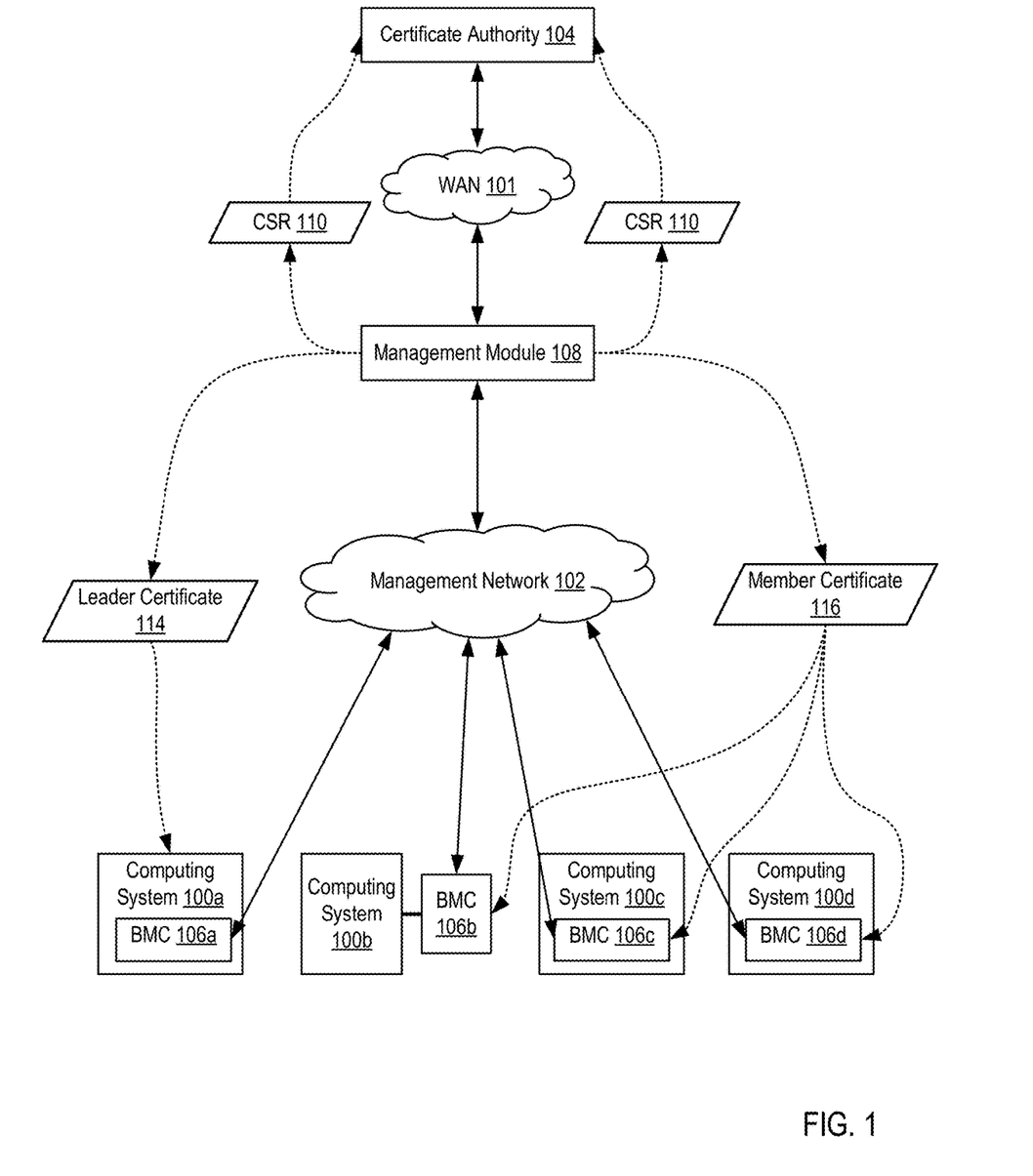
FIG. 1 shows an example block diagram of a system configured for BMC group administration in accordance with embodiments of the present disclosure.

Exemplary methods, apparatus, and products for BMC group administration in accordance with the present disclosure are described with reference to the accompanying drawings, beginning with FIG. 1. FIG. 1 sets forth an example block diagram of a system configured for BMC group administration in accordance with embodiments of the present disclosure. The example system of FIG. 1 includes a number of computing systems 100 connected to a management module 108 through a management network 102. The computing systems 100 include software and hardware capable of computing functions, and may be embodied as a server, workstation, storage array, and the like.

The example system of FIG. 1 includes a number of BMCs 106 associated with the number of computing systems 100. The example BMCs of FIG. 1, such as BMCs 106a, 106c, and 106d, may be located within the computing system, as shown for computing systems 100a, 100c, and 100d, or may be located outside of the computing system, as shown for computing system 100b. A BMC is a specialized service processor or controller that may be used for remote monitoring and management of a computing system, allowing admins to perform maintenance tasks or other management functions on a computing system without having to physically connect to the computing system. The BMCs 106 can be accessed and managed through a management module 108.

The management module 108 can be implemented as a computer hardware and software that serves an interface for users to manage one or more sets of computing systems. In some embodiments, the management module enables a system administrator to manage multiple data centers. The management module 108 may be coupled to the BMCs for such management through an out-of-band network referred to in this figure as a management network 102. The management module 108 of FIG. 1 is also coupled to a certificate authority 104 through a wide area network ('WAN') 101, such as the Internet.

The example certificate authority 104 operates as a trusted third party that performs validations of identities of entities and binds them to cryptographic keys through the issuance of digital certificates. For example, the certificate authority 104 provides a leader BMC with a leader certificate 114 and a member BMC with a member certificate 116. The example leader certificate 114 may be implemented in a manner similar to a client certificate in public key infrastructure ('PKI') while the example member certificates 116 may be implemented in a manner similar to server certificates. A digital certificate provided and signed by the certificate authority provides authentication by serving as a credential to validate the identity of the entity that it is issued to, and also provides encryption for secure communication over insecure networks such as the Internet. The example certificate authority 104 may provide a signed certificate in response to receiving a certificate signing request ('CSR') 110 from an entity, such as the management module 108. In the example of FIG. 1 the management module 108 can send a CSR to the certificate authority on behalf of the BMCs.

The example CSR 110 of FIG. 1 may be an encoded text file and includes the public key of the requestor as well as identity information of the requestor. The certificate authority 104, after receiving the CSR 110, may independently verify the information within the CSR and may then digitally sign the certificate and send, via the management network 102, the signed certificate back to the entity which requested the signed certificate, in this case the management module 108. The signed certificate may be digitally signed by the certificate authority 104 using a private key of the certificate authority. The signed certificate includes the public key and identity information from the CSR, as well as the certificate authority's signature signed using the certificate authority's private key. The signed certificate also includes the certificate of the certificate authority, which in turn includes the public key of the certificate authority.

The example signed certificates 114 and 116 may be provided to BMCs by the management module 108. The certificates 114 and 116 may then be used by the BMCs 106 to authenticate to one another and establish a secure communication session between one another. Authenticating to one another using the signed certificates may be carried out by a first BMC sending its signed certificate to a second BMC so that the second BMC may authenticate the first BMC by comparing the received signed certificate with its own signed certificate, verifying the identity of the BMC and verifying the signature of the certificate authority using the certificate authority's public key included within the certificate authority's certificate in its own signed certificate. For example, BMC 106a may send a signed leader certificate 114 to BMC 106b via a local area network ('LAN') (not shown in FIG. 1), along with a request, signed by a private key of the BMC 106a, to initiate a secure communication session. The example BMC 106b may then authenticate the received request, as well as the received leader certificate, using its own member certificate 116. In this example, authenticating the received leader certificate 114 includes verifying, by the BMC 106b, the certificate authority signature of the leader certificate 114 using the public key of the certificate authority included within the member certificate 116. Once the BMC 106b verifies the signature of the certificate authority, the BMC 106b may verify the identity of the BMC 106a using the identity information included within the received leader certificate 114. Verifying the leader certificate 114 and the identity of the BMC 106a establishes trust between BMC 106b and BMC 106a. Authenticating the request to initiate a secure communication session may be carried out by the BMC 106b using the public key of the now-trusted BMC 106a included in the received leader certificate 114 to decrypt the leader's signature included within the request, thereby verifying that the request is actually from the now-trusted BMC 106a.

In the example system of FIG. 1, the management module 108 operates on behalf of the computing systems and their associated BMCs to generate and transmit a CSR to the certificate authority 104, receives signed certificates, and later configures the computing systems and their associated BMCs with the signed certificates. In other examples, BMCs 106 may communicate directly with the certificate authority 104 to send CSRs and receive signed certificates.

A BMC group is a group of BMCs which allows a single BMC to manage and control multiple other BMCs. BMCs may be grouped according to a particular job or function that is common to the group of BMCs or may be grouped according to a selection by a system admin. An example BMC group may include multiple member BMCs and a single leader BMC. The example BMC group may be managed by the leader BMC, which is operable to send group-based commands to any number of the member BMCs within the group in order to control the member BMCs and thereby manage their associated computing systems.

In order for the leader BMC of a group to manage the member BMCs of a group, the leader BMC must first authenticate to each of the member BMCs for which control is desired. In conventional techniques of BMC group administration, systems require that that a group name and a group password be manually configured in all of the group member BMCs. Such conventional techniques further require that anytime the group password must be changed, the new group password must again be manually configured in all of the group member BMCs. According to embodiments of the present disclosure, authentication during BMC group administration may instead rely on the use of signed certificates obtained from a trusted third-party certificate authority. For example, a leader BMC may send a request to a member BMC to join the leader BMC's group similar to the above example of a BMC initiating a secure communication session with another BMC. In such an example, the request sent by the leader BMC to the member BMC is considered a request to join the leader BMC's group. Similarly, once a secure communication session is established between the leader BMC and the member BMC, the member BMC is considered to be within the group of the leader BMC.

Once a BMC is joined to a group, the member BMC generally cannot be added to another group until removed from its current group. In the example system of FIG. 1, a leader BMC may remove a member BMC from the leader BMC's group by sending a signed message to the member BMC to remove itself from the group. Once a member BMC has been removed from a group, the member BMC becomes available to accept a new request to join another BMC group. In another example, a member BMC may be removed from a BMC group by receiving a new certificate signed by the certificate authority. In such an example, the member BMC may be instructed to receive the new certificate by an administrator or administrative computing system, where the new certificate is received by the member BMC along with instructions indicating a group that the member BMC may join.

Figure 2:
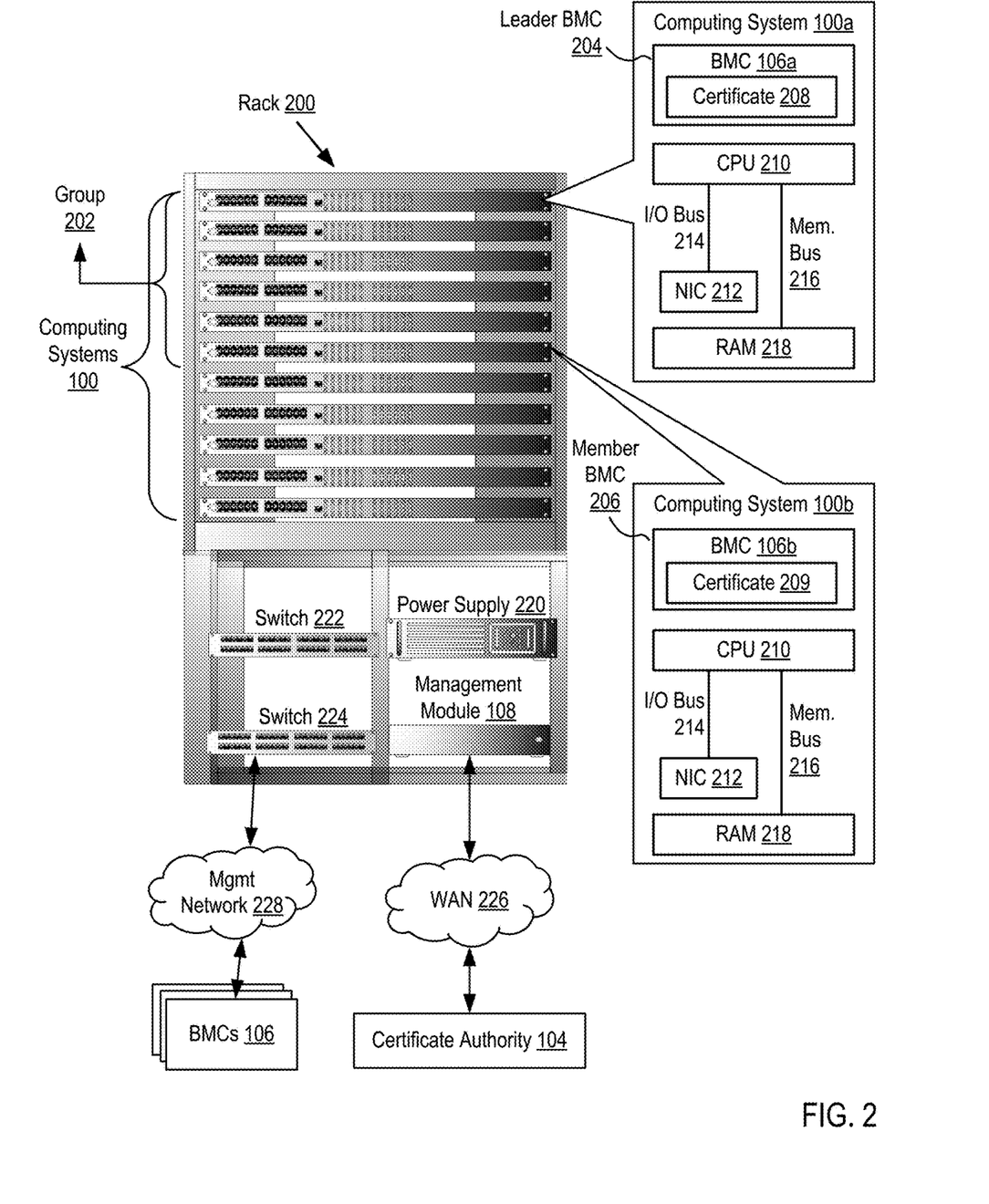
FIG. 2 shows an example block diagram of a rack mounted system configured for BMC group administration in accordance with embodiments of the present disclosure.

For further explanation, FIG. 2 sets forth an example block diagram of a rack mounted system configured for BMC group administration in accordance with embodiments of the present disclosure. The example system of FIG. 2 includes a rack 200, such as a standard 19-inch rack for mounting multiple electronic equipment modules.

The example rack 200 of FIG. 2 includes a number of computing systems 100, a power supply 220, switches 222 and 224, and a management module 108. The computing systems 100 include software and hardware capable of computing functions and may be embodied as a server, workstation, storage array, and the like. The power supply 220 converts main AC power to low-voltage regulated DC power for the internal components of the rack 200. The switch 222 may be a network switch that connects components within the rack 200 to a computer network, such as a LAN (not shown in FIG. 2) allowing communication between the BMCs. The switch 224 may be a network switch that connects the BMCs 106 to the management network 228. The management network enables the BMCs to be connected to the management module 108 and to one another through out-of-band communications. The management module 108 is connected to a certificate authority 104 through a WAN 226 and is used for communications between the certificate authority 104 and the BMCs 106.

Computing system 100a is depicted in further detail as an example of one of the computing systems 100. The example computing system 100a of FIG. 2 includes a BMC 106a, a central processing unit ('CPU') 210, main computer memory in the form of RAM ('Random Access Memory') 218 connected to the CPU 210 through a memory bus 216, and a network interface controller ('NIC') 212 connected to the CPU 210 through an input/output ('I/O') bus 214. Stored in memory of the BMC 106a is a certificate 208 received from the certificate authority 104, either directly from the certificate authority or through the management module 108 via the management network 228.

Computing system 100b is depicted in further detail as another example of one of the computing systems 100. The example computing system 100b of FIG. 2 includes a BMC 106b, a CPU 210, main computer memory in the form of RAM 218 connected to the CPU 210 through a memory bus 216, and an NIC 212 connected to the CPU 210 through an I/O bus 214. Stored in memory of the BMC 106b is a certificate 209 received from the certificate authority 104, either directly from the certificate authority or through the management module 108 via the management network 228.

The computing systems 100a and 100b differ in that the certificate 208 held by BMC 106a is different from the certificate 209 held by BMC 106b. The certificate 208 held by BMC 106a of computing system 100a identifies the BMC 106a as a leader BMC 204, and the certificate 209 held by BMC 106b of computing system 100b identifies the BMC 106b as a member BMC 206. The example BMCs 106a and 106b are shown in FIG. 2 as being part of the same group 202. The group 202 of FIG. 2 may be a group of BMCs that includes a single leader BMC 204, such as the example BMC 106a, and also includes multiple member BMCs 206, such as the example BMC 106b.

In the example of FIG. 2, the leader BMC 204 sends the leader certificate 208 and a request to join a group to the member BMC 206. Once the member BMC 206 authenticates leader BMC's certificate 208 through use of its own certificate 209 provided (directly or indirectly) from the same trusted certificate authority, member BMC 206 can acknowledge the request to join the group 202 (in an instance in which the member BMC is not already part of a group at the time of a receiving the request). In this way, the system administrator does not have to manually provide a password or group name to each and every BMC to be joined to a group 202.

Figure 3:
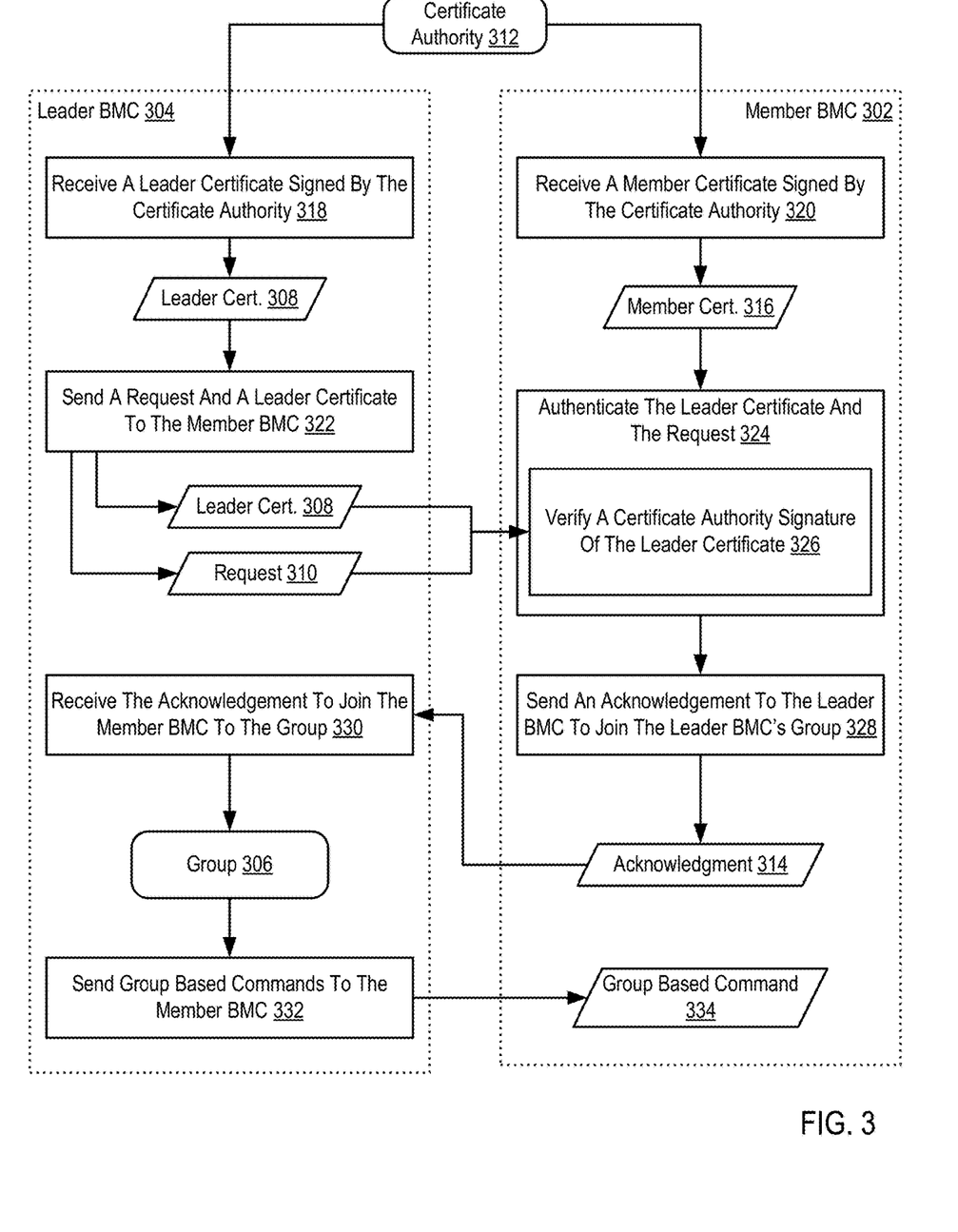
FIG. 3 is a flowchart of an example method for BMC group administration according to some embodiments of the present disclosure.

For further explanation, FIG. 3 sets forth a flow chart illustrating an exemplary method for BMC group administration according to embodiments of the present disclosure. The method of FIG. 3 includes receiving 318, by a leader BMC 304, a leader certificate 308. In the method of FIG. 3, the leader certificate 308 is signed by a certificate authority 312. Receiving 318 the leader certificate may be carried out by the management module 108 of FIG. 1 providing the leader BMC 304 with the leader certificate 308 over the management network 102 of FIG. 1. The leader certificate 308 may also be received by the leader BMC directly from the certificate authority 312 over the management network 102 of FIG. 1. For example, the leader BMC may receive the leader certificate from the certificate authority responsive to sending, either by the leader BMC or by the management module on behalf of the leader BMC, a CSR to the certificate authority 312 requesting a signed certificate. The CSR sent to the certificate authority may specify a type of certificate being requested, such as a leader certificate or a member certificate. The type of certificate being requested from the certificate authority may be selected by a system admin or may be preselected according to a set of rules or guidelines associated with the respective BMC.

The method of FIG. 3 also includes receiving 320, by a member BMC 302, a member certificate 316. In the method of FIG. 3, the member certificate 316 is signed by the certificate authority 312. The member BMC 302 receives 320 the member certificate either from the management module 108 of FIG. 1 over the management network 102 of FIG. 1 or directly from the certificate authority 312. The member BMC may receive a member certificate from the certificate authority as a response to a CSR, sent either by the member BMC or by the management module on behalf of the member BMC, to requesting a signed certificate. The management module may send multiple CSRs at once to the certificate authority on behalf of multiple member BMCs requesting to receive signed certificates, and then provision each of the member BMCs with a respective member certificate 316.

The method of FIG. 3 also includes sending 322, by the leader BMC 304 to the member BMC 302, a request 310 to join a group 306 of the leader BMC and the leader certificate 308. In the method of FIG. 3, the request 310 is signed by the leader BMC 304 and the leader certificate 308 is signed by the certificate authority 312. The request 310 may be signed by the leader BMC 304 using a private key of the leader BMC 304. Sending 322 the request and the leader certificate may be carried out by the leader BMC 304 sending the request 310 and the leader certificate 308 to the member BMC 302 over a network, such as a LAN (not shown in FIG. 3). The member BMC 302 may then receive the request 310 and the leader certificate 308 from the leader BMC. In some examples, the leader BMC 304 may send the request and leader certificate to multiple different member BMCs at once in order to request that each of the multiple BMCs join the leader BMC's group 306. In such an example, the multiple member BMCs would each receive the request and leader certificate from the leader BMC.

The method of FIG. 3 also includes authenticating 324, by the member BMC 302, the leader certificate 308 and the request 310. In the method of FIG. 3, authenticating 324 the leader certificate and the request includes verifying 326 the certificate authority signature (not shown in FIG. 3) of the leader certificate 308. Verifying 326 the certificate authority signature of the leader certificate may be carried out by the member BMC using the public key of the certificate authority certificate included within the member certificate to verify the certificate authority signature in the leader certificate received from the leader BMC 304. In some embodiments, where multiple member BMCs are sent the request and the leader certificate from the leader BMC, the authenticating 324 and verifying 326 steps may be carried out by each respective member BMC which received the leader certificate 308 and request 310.

Figure 4:
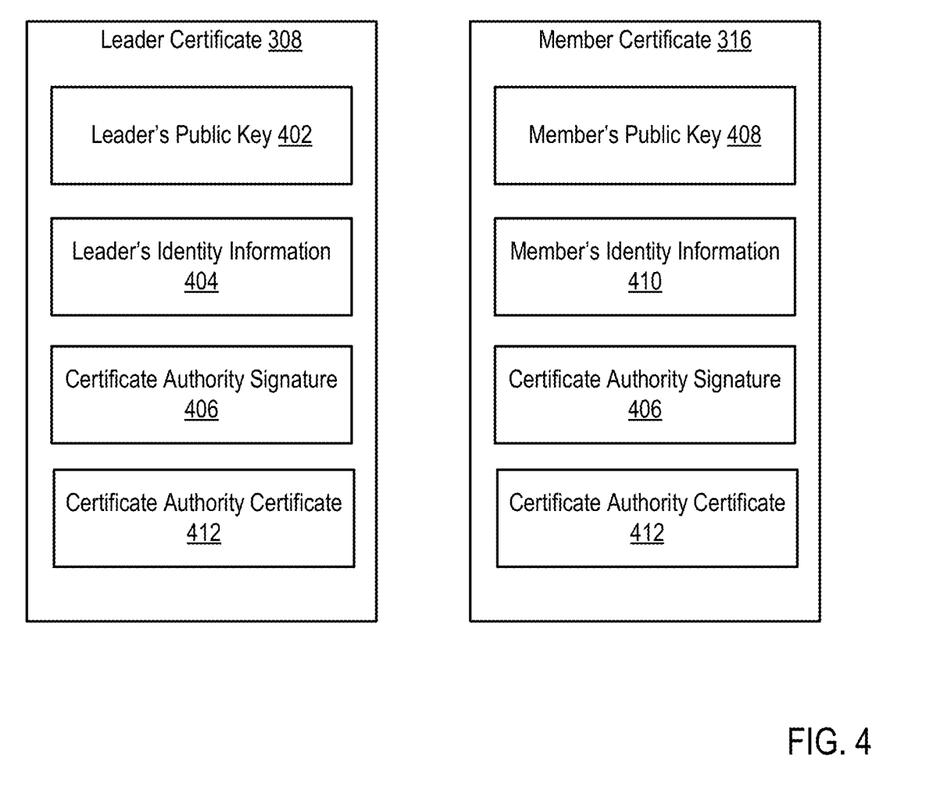
FIG. 4 shows an example block diagram of a leader certificate and member certificate in accordance with embodiments of the present disclosure.

For further explanation, FIG. 4 sets forth an example leader certificate and member certificate in accordance with embodiments of the present disclosure. The example leader certificate 308 of FIG. 4 includes a leader's public key 402, a leader's identity information 404, a certificate authority signature 406, and a certificate authority certificate 412. The leader's public key 402 is the public key of the leader BMC 304 in possession of the leader certificate 308. The leader's identity information 404 may include information describing the leader BMC 304, such as the type or model of the BMC. The certificate authority signature 406 includes the identity of the certificate authority which signed the certificate. The certificate authority certificate 412 includes the public key of the certificate authority. The leader certificate 308 identifies the BMC in possession of the leader certificate as a 'leader' BMC, operable to carry out BMC group forming actions and BMC group management functions.

The example member certificate 316 of FIG. 4 includes a member's public key 408, a member's identity information 410, a certificate authority signature 406, and a certificate authority certificate 412. The member's public key 408 is the public key of the member BMC 302 in possession of the member certificate 316. The member's identity information 410 may include information describing the member BMC 302, such as the type or model of the BMC. The certificate authority signature 406 includes the identity of the certificate authority which signed the certificate. The certificate authority certificate 412 includes the public key of the certificate authority. The member certificate 316 identifies the BMC in possession of the member certificate as a 'member' BMC, operable to accept or deny group joining requests and carry out group-based commands received from the leader BMC of whatever group the member BMC is a part of.

Turning back to the method of FIG. 3, when authenticating 324 the leader certificate and the request, the member BMC 302 may verify 326 the certificate authority signature of the leader certificate. Verifying 326 may include verifying, by the member BMC, the signature 406 of the certificate authority using the public key of the certificate authority included within the certificate authority certificate 412 of the member certificate. Once the member BMC 302 verifies the signature of the certificate authority, the member BMC 302 may verify the identity of the leader BMC using the leader's identity information 404 included in the received leader certificate 308. Verifying the leader certificate and the identity of the leader BMC 304 establishes trust between the member BMC 302 and the leader BMC 304. Authenticating 324 the request 310 may be carried out by using the public key 402 of the now-trusted leader BMC 304 included in the received leader certificate 308 to decrypt the leader's signature included within the request 310, thereby verifying that the request 310 is actually from the trusted leader BMC 304.

Once the member BMC 302 has authenticated 324 the leader certificate and the request, the method of FIG. 3 continues by sending 328, by the member BMC 302, an acknowledgement 314 to the leader BMC 304 to join the leader BMC's group 306. Sending 328 the acknowledgement may be carried out by over a management network. The acknowledgement 314 may indicate to the leader BMC that the member BMC has accepted the request 310 to join the leader BMC's group 306, allowing the leader BMC to establish a secure communication session with the member BMC. In some instances, the acknowledgement 314 may be sent by the member BMC, signed by the member BMC, along with the member BMC's member certificate 316.

The method of FIG. 3 also includes receiving 330 the acknowledgement 314 from the member BMC to join the leader BMC's group 306. The leader BMC 304 may receive 330 the acknowledgement 314 over a management network. Once the leader BMC 304 has received the acknowledgement 314, the leader BMC may establish the secure communication session and thereby add the member BMC 302 to the leader BMC's group 306.

The method of FIG. 3 also includes sending 332, by the leader BMC 304, group-based commands 334 to the member BMC 302. The leader BMC 304 may send 332 group-based commands to the member BMC over a management network. in order to manage the member BMCs of the group 306. The group-based commands may be sent to some or all of the member BMCs included within the group 306. The group-based commands 334 sent to the member BMCs within the group may include commands to control or alter the member BMC's associated computing systems 100, commands to retrieve monitoring data, commands to initiate monitoring of one or more computer subsystems or components, and so on as will occur to readers of skill in the art.

Figure 5:
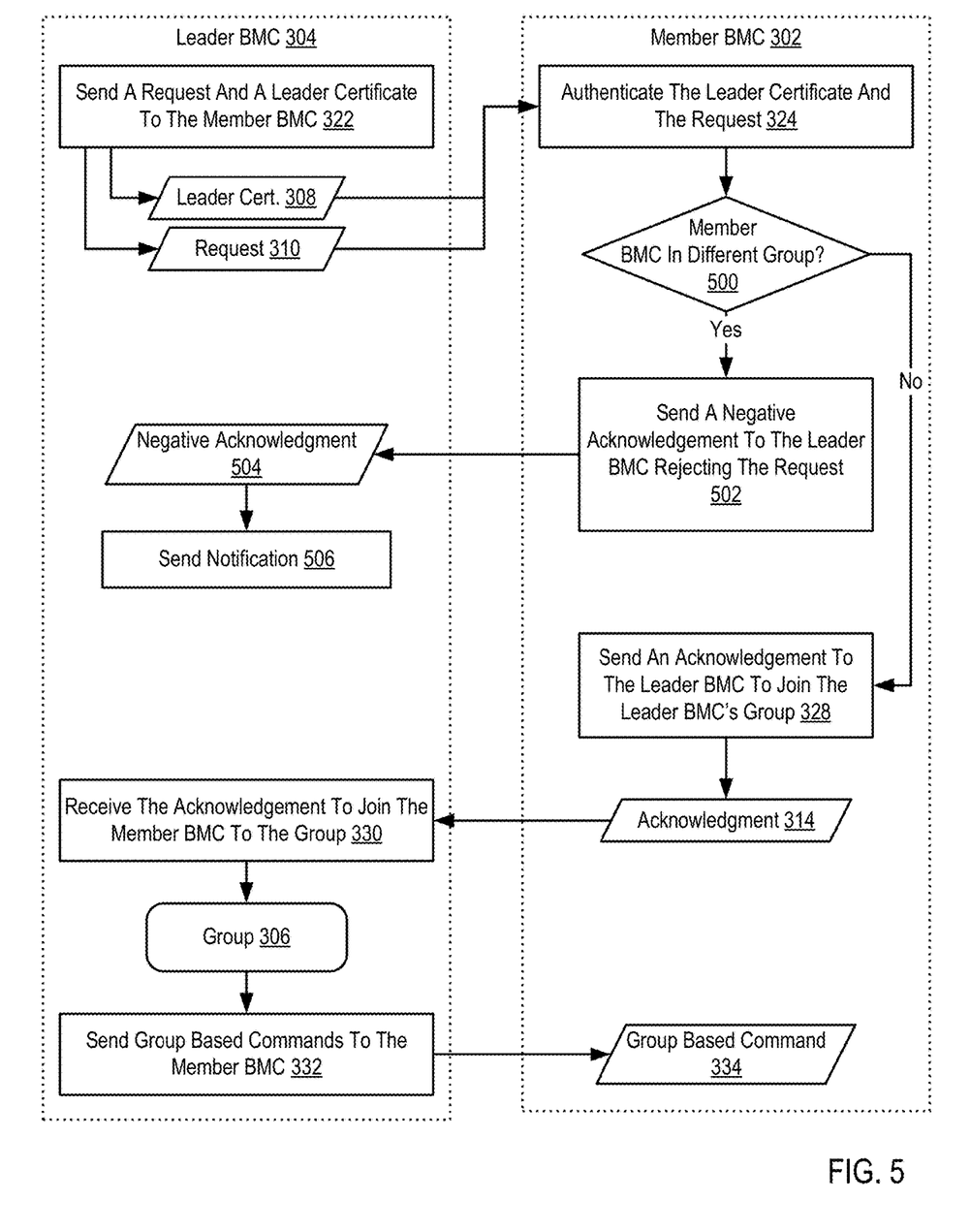
FIG. 5 is a flowchart of an example method for BMC group administration according to some embodiments of the present disclosure.

For further explanation, FIG. 5 sets forth a flow chart illustrating a further exemplary method for BMC group administration according to embodiments of the present disclosure. The method of FIG. 5 is similar to that of FIG. 3 except that the method of FIG. 5 includes determining 500, by the member BMC 302, whether the member BMC has previously joined a different group. Determining 500 whether the member BMC has previously joined a different group may be carried out by the determining whether the member BMC 302 is in possession of another leader BMC's security certificate. In instances in which the member BMC 302 is in possession of another leader BMC's security certificate at the time of receiving the request 310, the member BMC has already joined another group and is no longer available to join any other group. In some embodiments, where multiple member BMCs are sent the request and the leader certificate from the leader BMC, the determining 500 step may be carried out by each respective member BMC which received the leader certificate 308 and request 310.

If the member BMC 302 has previously joined a different group, the member BMC 302 sends 502 a negative acknowledgement 504 to the leader BMC 304, thereby rejecting the request 310. The member BMC 302 can send 502 the negative acknowledgement 504 to the leader BMC 304 over a management network. The negative acknowledgement 504 may indicate to the leader BMC that the member BMC has rejected the request 310 to join the leader BMC's group 306. A negative acknowledgement may be in a predetermined format, include a particular identifier in a header, or include particular content in the body of the message that indicates to the leader BMC that the message is a negative acknowledgement.

The method of FIG. 5 also includes sending 506, by the leader BMC 304, a notification that the member BMC 302 is unavailable to join the leader BMC's group 306. The leader BMC 304 may send the notification to a system administrator or other user through a management network and a management module (seen in FIG. 1). In some embodiments, the leader BMC can also inform other leader BMCs or other member BMCs through the management network.

If the member BMC 302 has not previously joined a different group the method of FIG. 5 continues by sending 328, by the member BMC 302, an acknowledgement 314 to the leader BMC 304 to join the leader BMC's group 306. Sending 328 the acknowledgement to indicates to the leader BMC that the member BMC has accepted the request 310 to join the leader BMC's group 306, allowing the leader BMC to establish a secure communication session with the member BMC. In some instances, the acknowledgement 314 may be sent by the member BMC along with the member BMC's member certificate 316 for use in further secured communications between the member and leader BMCs.

In view of the explanations set forth above, readers will recognize that the benefits of BMC group administration according to embodiments of the present disclosure include increased system efficiency for authentication between BMCs when forming a BMC group; improved methods for BMC group administration by allowing for simplified authentication between BMCs without relying on manually configuring each BMC with a common group password; and others as will occur to readers of skill in the art.

Exemplary embodiments of the present disclosure are described largely in the context of a fully functional computer system for BMC group administration. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will also recognize that, although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of BMC ('Baseboard Management Controller') group administration, the method comprising:
   receiving, by a member BMC from a leader BMC, a leader certificate and a request to join a group of the leader BMC, wherein the request is signed by the leader BMC and the leader certificate is signed by a certificate authority;
   authenticating, by the member BMC, the leader certificate and the request; and
   sending, by the member BMC, an acknowledgement to the leader BMC to join the leader BMC's group.

2. The method of claim 1, wherein the leader certificate identifies the leader BMC as a leader of the group.

3. The method of claim 1, further comprising receiving, by the member BMC, group-based commands from the leader BMC.

4. The method of claim 1, further comprising receiving, by the member BMC, a member certificate signed by the certificate authority.

5. The method of claim 1, wherein authenticating the leader certificate further comprises verifying a certificate authority signature of the leader certificate.

6. The method of claim 1, further comprising:
   responsive to receiving the request to join the group of the leader BMC, determining, by the member BMC, whether the member BMC has previously joined a different group,
   if the member BMC has previously joined a different group, sending a negative acknowledgement to the leader BMC, thereby rejecting the request; and
   sending the acknowledgement only if the member BMC has not previously joined a different group.

7. The method of claim 1, wherein the acknowledgement is signed by the member BMC.

8. A method of BMC ('Baseboard Management Controller') group administration, the method comprising:
   sending, by a leader BMC to a member BMC, a request to join a group of the leader BMC and a leader certificate signed by a certificate authority; and
   receiving, by the leader BMC responsive to the member BMC authenticating the request and the leader certificate, an acknowledgement from the member BMC to join the leader BMC's group.

9. The method of claim 8, wherein the leader certificate identifies the leader BMC as a leader of the group.

10. The method of claim 8, further comprising sending, by the leader BMC, group-based commands to the member BMC.

11. The method of claim 8, further comprising receiving the leader certificate signed by the certificate authority.

12. The method of claim 8, further comprising, responsive to receiving a negative acknowledgement from the member BMC, sending a notification that the member BMC is unavailable to join the leader BMC's group.

13. The method of claim 8, wherein the acknowledgement received from the member BMC is signed by the member BMC.

14. A computer program product for BMC ('Baseboard Management Controller') group administration, the computer program product comprising a non-volatile computer readable storage medium and computer program instructions stored therein that are configured to, when executed by a processor, cause a computer to perform operations comprising:
   receiving, by a member BMC from a leader BMC, a leader certificate and a request to join a group of the leader BMC, wherein the request is signed by the leader BMC and the leader certificate is signed by a certificate authority;
   authenticating, by the member BMC, the leader certificate and the request; and
   sending, by the member BMC, an acknowledgement to the leader BMC to join the leader BMC's group.

15. The computer program product of claim 14, wherein the leader certificate identifies the leader BMC as a leader of the group.

16. The computer program product of claim 14, further comprising computer program instructions stored therein that are configured to, when executed by a processor, cause a computer to perform an operation comprising receiving, by the member BMC, group-based commands from the leader BMC.

17. The computer program product of claim 14, further comprising computer program instructions stored therein that are configured to, when executed by a processor, cause a computer to perform an operation comprising receiving, by the member BMC, a member certificate signed by the certificate authority.

18. The computer program product of claim 14, wherein authenticating the leader certificate further comprises verifying a certificate authority signature of the leader certificate.

19. The computer program product of claim 14, further comprising computer program instructions stored therein that are configured to, when executed by a processor, cause a computer to perform operations comprising:
   responsive to receiving the request to join the group of the leader BMC, determining, by the member BMC, whether the member BMC has previously joined a different group,
   if the member BMC has previously joined a different group, sending a negative acknowledgement to the leader BMC, thereby rejecting the request; and
   sending the acknowledgement only if the member BMC has not previously joined a different group.

20. The computer program product of claim 14, wherein the acknowledgement is signed by the member BMC.

* * * * *